US009908468B2

(12) United States Patent
Vladimerou et al.

(10) Patent No.: US 9,908,468 B2
(45) Date of Patent: Mar. 6, 2018

(54) APPARATUS AND METHOD FOR PROVIDING AN EXTENDED FORWARD COLLISION WARNING

(71) Applicant: TOYOTA MOTOR ENGINEERING & MANUFACTURING NORTH AMERICA, INC., Erlanger, KY (US)

(72) Inventors: Vladimeros Vladimerou, Ypsilanti, MI (US); Derek Caveney, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 161 days.

(21) Appl. No.: 14/993,782

(22) Filed: Jan. 12, 2016

(65) Prior Publication Data
US 2017/0197549 A1    Jul. 13, 2017

(51) Int. Cl.
| B60Q 9/00 | (2006.01) |
| G06N 5/04 | (2006.01) |
| B60W 30/08 | (2012.01) |
| G08G 1/16 | (2006.01) |

(52) U.S. Cl.
CPC .............. B60Q 9/008 (2013.01); B60W 30/08 (2013.01); G06N 5/04 (2013.01); G08G 1/166 (2013.01)

(58) Field of Classification Search
CPC combination set(s) only.
See application file for complete search history.

(56) References Cited

U.S. PATENT DOCUMENTS

| 6,278,360 | B1 | 8/2001 | Yanagi | |
| 7,162,369 | B2 | 1/2007 | Thorne | |
| 7,425,903 | B2 | 9/2008 | Boss et al. | |
| 7,774,137 | B2 | 8/2010 | Thorne | |
| 8,907,814 | B2 | 12/2014 | Chen | |
| 9,114,707 | B2* | 8/2015 | Shida | B60W 30/16 |
| 2007/0096885 | A1* | 5/2007 | Cheng | B60W 40/04 340/435 |
| 2012/0310518 | A1 | 12/2012 | Chen et al. | |
| 2014/0136044 | A1 | 5/2014 | Conrad | |
| 2014/0358413 | A1* | 12/2014 | Trombley | G06G 1/00 701/118 |
| 2015/0025784 | A1* | 1/2015 | Kastner | B60W 30/09 701/119 |

(Continued)

*Primary Examiner* — Brian Zimmerman
*Assistant Examiner* — Cal Eustaquio
(74) *Attorney, Agent, or Firm* — Oblon, McClelland, Maier & Neustadt, L.L.P.

(57) ABSTRACT

An apparatus and method for generating a collision warning to a driver of a host vehicle. The method estimates geometry of a lane of a road in which the host vehicle is traversing and further identifies, via a non-line-of-sight sensor, at least one remote vehicle traversing ahead of the host vehicle in the estimated lane of the road. The host vehicle tracks, via a line of sight sensor, a preceding vehicle traversing directly ahead of the host vehicle in the estimated road-lane and detects a speed of a slowest remote vehicle of the at least one identified remote vehicles. The host vehicle predicts a motion of the preceding vehicle based on the detected speed of the slowest remote vehicle and an inter-vehicle distance, and generates a warning to the driver of the host vehicle based on the predicted relative motion of the preceding vehicle to the host vehicle.

18 Claims, 11 Drawing Sheets

(56) References Cited

U.S. PATENT DOCUMENTS

| | | |
|---|---|---|
| 2015/0120160 A1 | 4/2015 | Foltin |
| 2016/0055750 A1* | 2/2016 | Linder ................... G08G 1/16 340/905 |
| 2017/0113683 A1* | 4/2017 | Mudalige .............. B60W 30/08 |

* cited by examiner

APPARATUS AND METHOD FOR PROVIDING AN EXTENDED FORWARD COLLISION WARNING

FIELD

The present disclosure relates generally to the field of vehicular communication systems and a mechanism of providing reliable collision warnings to the vehicles.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Vehicles include brake lights that turn on when a vehicle's brakes are applied by the driver. The brake lights serve as a mechanism to warn other drivers behind the vehicle as to when the vehicle is slowing down, so that the other drivers may also slowdown in order to avoid a collision with the vehicle.

However, there are some cases where brake lights are ineffective for warning other drivers that the vehicle is slowing down. For instance, a driver in a rear vehicle may be unable to see the front vehicle's brake lights without having a direct line-of-sight to the front vehicle's brake lights. If the vehicles are traversing a sharp turn or any other intervening vehicles are between the front vehicle and the rear vehicle, the driver of the rear vehicle may be unable to see the front vehicle's brake lights and may therefore not be warned in a timely manner. Additionally, weather conditions such as fog, heavy rain, and/or heavy snow may limit the transmission range of the brake lights. Further, the brake lights may malfunction, and/or the driver of the rear vehicle may simply not be paying attention to the front vehicle's brake lights. Such situations may prove to be potentially harmful to the driver of vehicle.

Adaptive cruise control mechanisms are used to maintain a desired cruising velocity of a vehicle to maintain a safe distance from a preceding vehicle. However, in dense traffic, the preceding vehicle may undergo considerable velocity changes, necessitating similar velocity changes in the vehicle. Emergency electronic brake light is another mechanism used to warn the driver of a vehicle of imminent collision. However, these mechanisms typically detect only the case of the preceding vehicle braking hard, thereby not reacting to remote vehicles that are at significantly slow speeds already. Thus, the above stated collision avoidance mechanisms provide an uncomfortable experience for the driver of the vehicle in some cases.

Accordingly, there is a requirement for a technique that enables warning the driver of the vehicle about an imminent collision in a time effective manner, wherein the driver of the vehicle may comfortably slow down to avoid collisions.

SUMMARY

An aspect of the present disclosure provides for a method of generating a collision warning to a driver of a host vehicle. The method includes the steps of estimating, by circuitry, a geometry of a lane of a road in which the host vehicle is traversing; identifying, via a non-line-of-sight sensor, at least one remote vehicle traversing ahead of the host vehicle in the estimated lane of the road; tracking, via a line of sight sensor, a preceding vehicle traversing directly ahead of the host vehicle in the estimated road-lane; detecting a speed of a slowest remote vehicle of the at least one identified remote vehicles. The method further predicts by circuitry, a motion of the preceding vehicle based on the detected speed of the slowest remote vehicle and an inter-vehicle distance; and generates a warning to the driver of the host vehicle based on the predicted relative motion of the preceding vehicle to the host vehicle.

According to one aspect of the present disclosure is provided a device for generating a collision warning to a driver of a host vehicle. The device includes circuitry that is configured to: estimate a geometry of a lane of a road in which the host vehicle is traversing, identify, via a non-line-of-sight sensor, at least one remote vehicle traversing ahead of the host vehicle in the estimated lane of the road, track, via a line of sight sensor, a preceding vehicle traversing directly ahead of the host vehicle in the estimated road-lane, detect a speed of a slowest remote vehicle of the at least one identified remote vehicles, predict a motion of the preceding vehicle based on the detected speed of the slowest remote vehicle and an inter-vehicle distance, and generate a warning to the driver of the host vehicle based on the predicted relative motion of the preceding vehicle to the host vehicle.

According to one aspect of the present disclosure is provided a non-transitory computer readable medium having stored thereon a program that when executed by a computer, causes the computer to execute a method of generating a collision warning to a driver of a host vehicle. The method includes estimating a geometry of a lane of a road in which the host vehicle is traversing; identifying, via a non-line-of-sight sensor, at least one remote vehicle traversing ahead of the host vehicle in the estimated lane of the road; tracking, via a line of sight sensor, a preceding vehicle traversing directly ahead of the host vehicle in the estimated road-lane; detecting a speed of a slowest remote vehicle of the at least one of the identified remote vehicles; predicting a motion of the preceding vehicle based on the detected speed of the slowest remote vehicle and an inter-vehicle distance; and generating a warning to the driver of the host vehicle based on the predicted relative motion of the preceding vehicle to the host vehicle The foregoing paragraphs have been provided by way of general introduction, and are not intended to limit the scope of the following claims. The described embodiments together, with further advantages, will be best understood by reference to the following detailed description taken in conjunction with the accompanying drawings.

BRIEF DESCRIPTION OF THE DRAWINGS

Various embodiments of this disclosure that are provided as examples will be described in detail with reference to the following figures, wherein like numerals reference like elements, and wherein.

DETAILED DESCRIPTION

Figure 1:
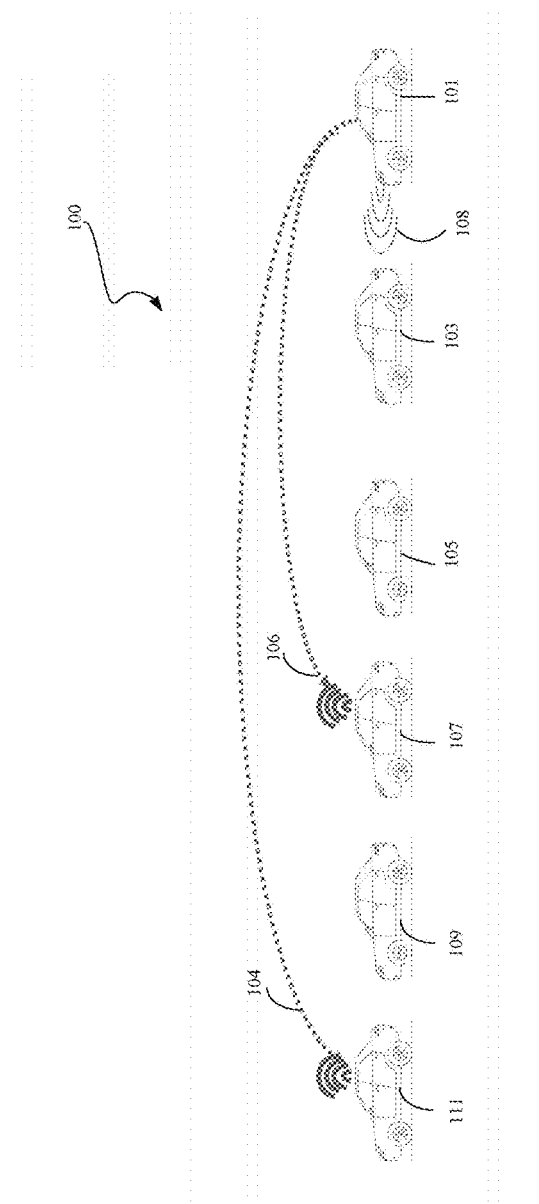
FIG. 1 illustrates according to an embodiment, an extended forward collision warning (EFCW) system.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes and systems provided in particular implementations. However, the processes and systems will operate effectively in other implementations. Phrases such as "an embodiment", "one embodiment" and "another embodiment" may refer to the same or different embodiments. The embodiments will be described with respect to methods and compositions having certain components. However, the methods and compositions may include more or less components than those shown, and variations in the arrangement and type of the components may be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by appended claims.

Furthermore, where a range of values is provided, it is to be understood that each intervening value between an upper and lower limit of the range—and any other stated or intervening value in that stated range is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. The following definitions are intended to aid the reader in understanding the present disclosure, but are not intended to vary or otherwise limit the meaning of such terms unless specifically indicated.

In the present disclosure, frequent references are made to the terms 'host vehicle', 'preceding vehicle' and 'remote vehicle'. In aspects of the present disclosure, a preceding vehicle is intended to mean a vehicle that is travelling on a given roadway, immediately in front of the host vehicle, whereas, a remote vehicle is intended to mean a vehicle that is travelling farther ahead of the host vehicle (and the preceding vehicle) on the roadway. Additionally, the term 'ego-vehicle' (i.e., own vehicle) is intended to correspond to the host vehicle, and the terms are used interchangeably. Further, in the present disclosure, the host vehicle/ego-vehicle is labeled as (host vehicle) or 'EV' (ego-vehicle), respectively, while the preceding vehicle is labeled as 'PV', and the remote vehicle is labeled as 'RV'.

Turning now to FIG. 1, is illustrated according to one embodiment, an extended forward collision warning (EFCW) system 100. The EFCW system 100 as illustrated in FIG. 1 includes a host vehicle 101 traversing behind a vehicle 103. The vehicle 103 is referred to herein as a preceding vehicle. Vehicles 105, 107, 109, and 111 are remote vehicles that are traversing in front of the preceding vehicle 103. For the sake of illustration, all remote vehicles 105, 107, 109, and 111 are depicted as traversing in the same lane (i.e., a straight line) as the host vehicle 101. However, a filtering technique described later with respect to FIG. 6C enables the host vehicle 101 to determine which remote vehicles traversing in its own lane are to be tracked by the host vehicle.

According to one embodiment, the host vehicle 101 includes an electronic control unit (ECU) (also referred to herein as an embedded computer unit, and described later with reference to FIG. 2) that controls one or more electrical systems or sub-systems in a vehicle. The ECU is configured to receive data from on-board sensors and further perform the required computations to warn the driver of the host vehicle 101 of an imminent collision. By one embodiment, the host vehicle 101 utilizes line-of-sight sensors and non-line-of-sight sensors to provide a warning to the driver of the host vehicle 101 in a timely manner.

The host vehicle 101 includes a radar sensor that utilizes radio waves 108 to detect objects and determine the object's position and velocity. As shown in FIG. 1, the radio waves 108 are utilized to detect and track the movement of the preceding vehicle 103. The radar included in the host vehicle 101 may be long range radar with a narrow field of view, a mid-range radar, or a short range radar having a wider field of view. Additionally, the host vehicle 101 may also be equipped with a camera to track the preceding vehicle 103. The camera may be integrated into a monocular or stereo configuration. Monocular cameras have a field of view of in the range 50° to 60° and a range of 100-200 meters. Stereo cameras on the other hand accomplish the same task as the mono cameras but provide greater reliability. Furthermore, the host vehicle 101 may also include a light detection and ranging (LIDAR) sensor that can be utilized to track the preceding vehicle 103. Accordingly, in the present embodiment, the host vehicle 101 tracks the immediately preceding vehicle 103 by using at least one of the radar sensor, LIDAR sensor and the camera.

The host vehicle 101 further includes non-line of sight sensors such as a dedicated short range communication sensor (DSRC), cellular sensor, and the like, to identify remote vehicles travelling in the same lane as the host vehicle (also referred to herein as an 'ego' lane, i.e., the road lane in which the host vehicle traverses). As shown in FIG. 1, the host vehicle 101 utilizes non-line of sight sensors to identify remote vehicles 111 and 107 that are traveling in the ego lane at a substantially lower speed than the host vehicle 101. The remote vehicles 111 and 107 are identified by non-line of sight communication represented as 104 and 106, respectively.

By one embodiment, the host vehicle 101 identifies remote vehicles travelling in the ego lane at lower speeds (compared to the host vehicle's current speed) or remote vehicles that are stopped in the ego lane. Further, by utilizing line of sight sensors, the host vehicle 101 tracks the preceding vehicle 103 and anticipates the motion of the preceding vehicle 103 based on the determination of the remote vehicle's motion. Accordingly, based on the above stated identification and tracking performed by the host vehicle, the ECU in the host vehicle 101 warns the driver to either comfortably slow down or brake immediately in order to avoid collisions.

Figure 2:
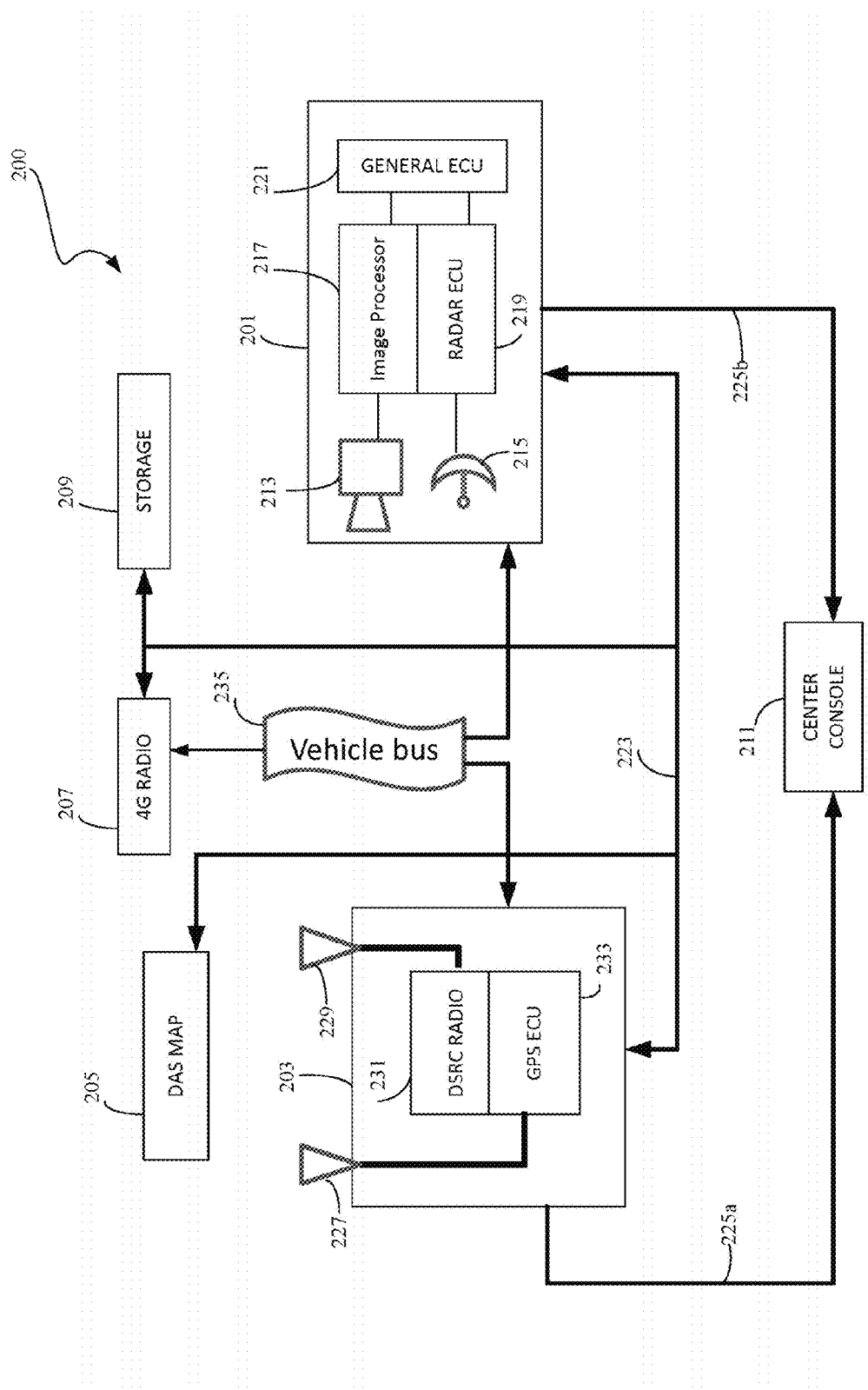
FIG. 2 illustrates according to one embodiment, a hardware block diagram of an embedded control system included in a vehicle.

FIG. 2 illustrates according to one embodiment, a hardware block diagram of an embedded control system 200 included in the host vehicle 101 of FIG. 1. The embedded control system 200 includes an electronic subsystem-I, 201, and an electronic subsystem-II, 203, which are coupled together by an electronic bus 223. The subsystems 201 and 203 include embedded control units (ECUs) i.e., processing circuits (described later with reference to FIG. 9) that control one or more electrical system or subsystems in the vehicle.

The ECUs receive data from on-board sensors and perform information processing operations as well as distribution of instructions to various in-vehicle systems. It must be appreciated that each ECU can work in an independent manner, wherein the ECU operates its own firmware. However, the ECU's may cooperate with one another to solve complex processing operations.

The subsystem 201 includes a camera 213 and a line of sight sensor-radar 215 that are coupled respectively to an image processor 217 and radar ECU 219. The radar 215 utilizes radio waves to detect a vehicle and determine the detected vehicles speed. The radar 215 may be a long range radar with a narrow field of view, a mid-range radar, or a short range radar having a wider field of view. The camera 213 may be used to track a preceding vehicle. As stated previously, the camera may be a monocular or a stereo type camera. The image processor 217 and the radar ECU 219 are coupled to an on-board ECU 221 that may be configured to process the combined information received from the camera 213 and the radar 215.

The subsystem 203 includes a GPS antenna 227 coupled to a GPS ECU module 233. The data obtained from GPS can be used to determine several valuable pieces of information, including how far a vehicle has traveled, how long it has been traveling, its current and average speeds, and its estimated time of arrival at the destination. Further, the subsystem 203 further includes a non-line-of-sight sensor such as a dedicated short range communication sensor (DSRC) that may operate in the 5.9 GHz spectrum. For instance, as shown in FIG. 2, the subsystem 203 includes a DSRC antenna 229 that is coupled to a DSRC radio 231.

The subsystems 201 and 203 are coupled together via a serial bus 223. The serial bus 223 may be a controller area network (CAN) type of serial bus that allows ECUs to communicate with each other within a vehicle. Additionally, the CAN may be a low-speed CAN (ISO 11519) that offers data transfer rates of up to 125 Kbps, or alternatively the CAN may be a high-speed CAN (ISO 11898) that achieves data rates up to 1 Mbps. It must appreciated that the serial bus 223 may also be a local interconnect network (LIN) or a FlexRay type of serial bus that offers two 10 Mbps data channels.

By one embodiment, the subsystems 201 and 203 may be coupled to a vehicle bus 235 that provides Ethernet connections to different modules included in the vehicle system such as a 4G radio 207. Additionally, the subsystems 201 and 203 may communicate via the serial bus 223 to a driver assistance system (DAS) map that provides information such as road curvature, number of lanes in the road and the like. Moreover the system 200 as depicted FIG. 2 includes storage (memory) 209, wherein information processed by the ECUs may be stored. For instance, as described later, the host vehicle may maintain a queue of remote vehicles that are currently being tracked by the host vehicle. Such tracking information may be stored in the memory 209. Further, the subsystems 201 and 203 may be coupled to a center console unit 211 via a digital I/O interface. The center console 211 includes a display panel and a speaker that may be utilized in providing audio-visual warning messages to the driver of the vehicle. Accordingly, as described next, the host vehicle incorporates both line of sight sensors and non-line of sight sensors to issue collision warnings to the driver of a vehicle.

Figure 3:
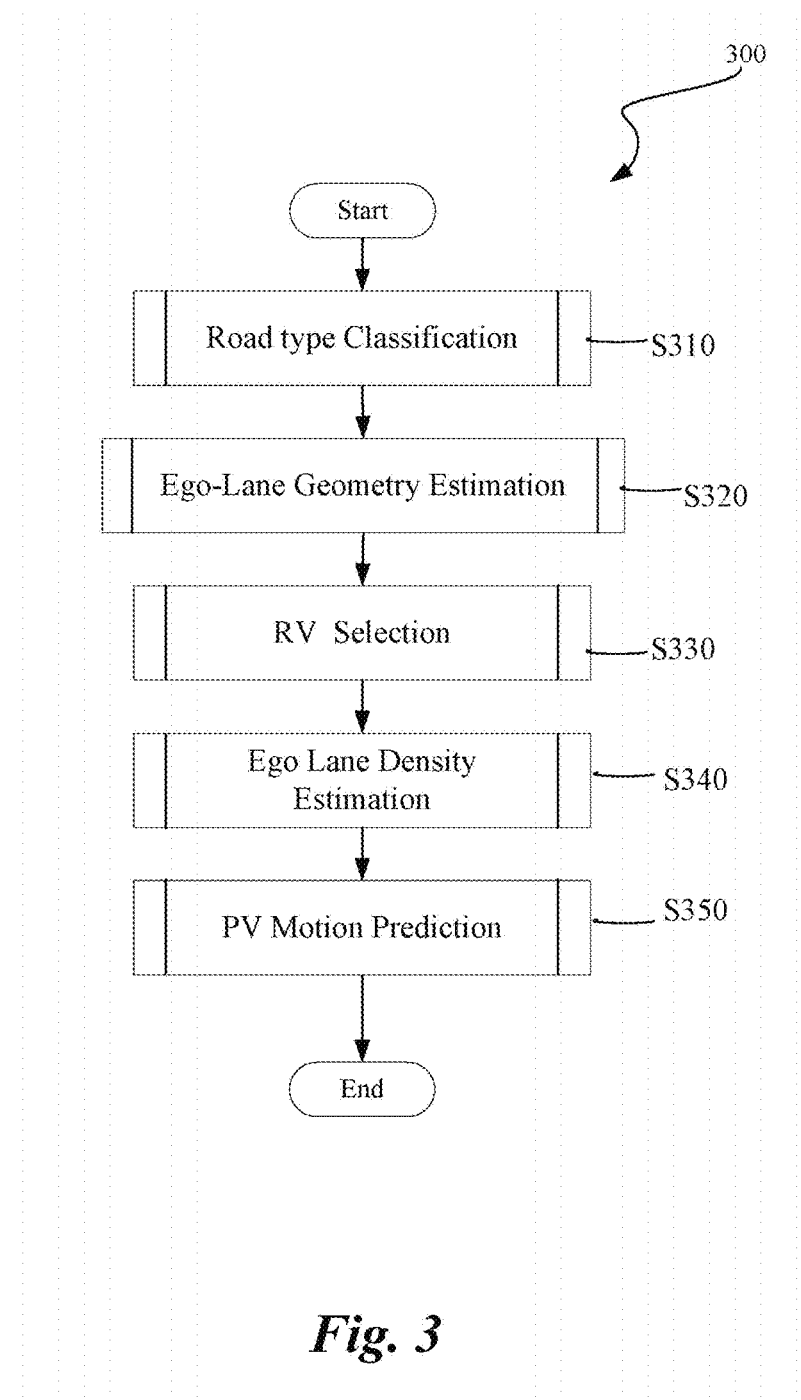
FIG. 3 depicts a flowchart illustrating the steps performed by the EFCW system.

FIG. 3 depicts a flowchart 300 illustrating the steps performed by the EFCW system. The process 300 commences in step S310, wherein the EFCW system determines a type of road on which the host vehicle is traversing. According to one embodiment, the host vehicle utilizes the line of sight sensors to determine the type of the road. Specifically, the host vehicle utilizes the line of sight sensors to determine whether the road on which the host vehicle is currently traversing is a 'divided highway'.

By one embodiment, the EFCW system classifies the road as a divided highway only when the following two conditions are satisfied: (a) a current speed at which the vehicle is travelling (denoted as v(t)) is greater than a predetermined speed threshold (V), and (b) the speed of the vehicle in a certain time window (T) is greater than the predetermined speed threshold. Specifically, for a value of $\tau<T$, the speed of the vehicle (v (t–$\tau$)) is greater than V. By one embodiment, the EFCW system utilizes the values of V=45 miles per hour (mph) and T=30 seconds (sec) to determine whether the road the vehicle is traversing is a divided highway.

In contrast, the EFCW system classifies the road type as not being a divided highway, if within a predetermined distance (D) traversed by the host vehicle (also referred to herein as ego-vehicle) either of the following two conditions are satisfied: (a) oncoming traffic having a longitudinal relative speed (with respect to the ego-vehicle) of at least –5 mph is detected by the ego vehicle, and (b) traffic having a lateral speed of at least 6 mph is detected by the ego-vehicle.

Figure 4A:
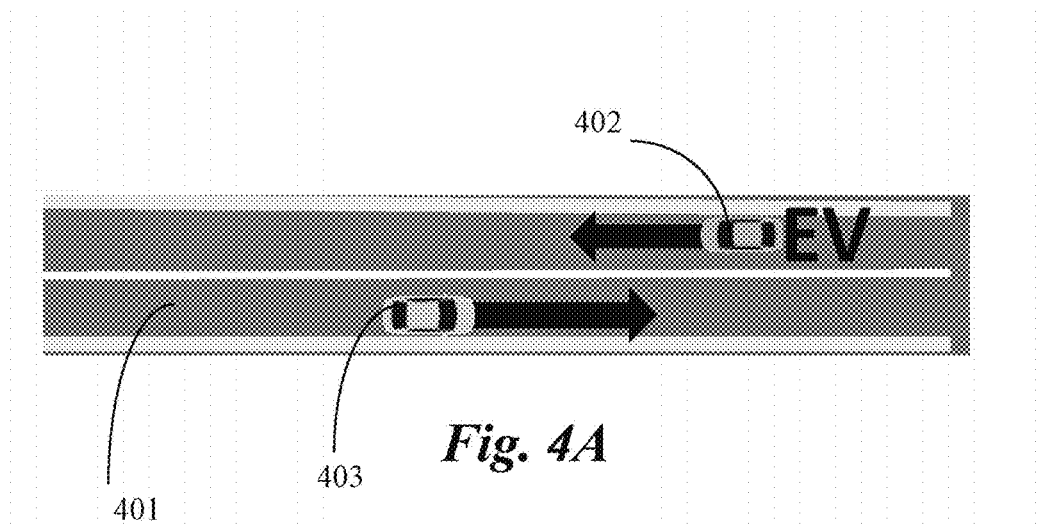
FIGS. 4A and 4B depict according to one embodiment, road classification performed by the vehicle.
Figure 4B:
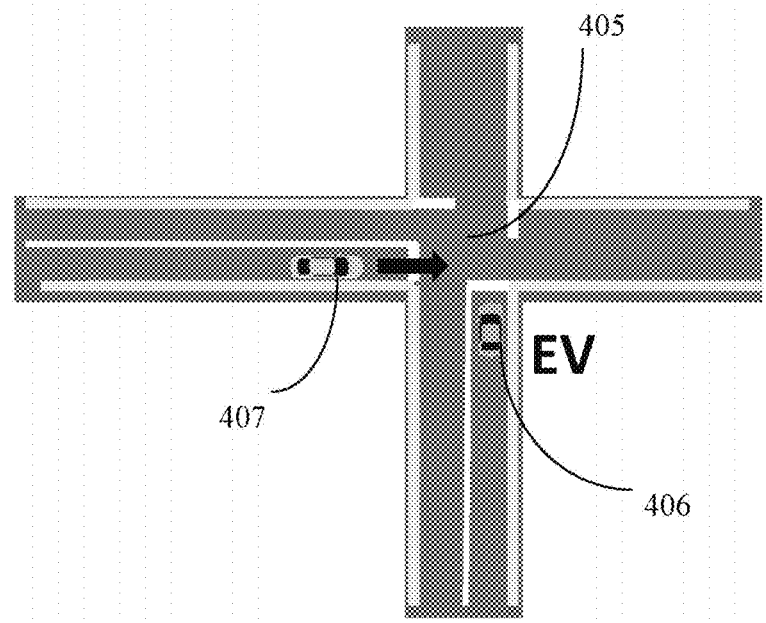

For instance, referring to FIG. 4A, the ego vehicle (represented as EV) 402 detects, via a line of sight sensor, an oncoming vehicle 403 that is traversing in the opposite direction on the road 401. Based on the computed relative longitudinal speed of the oncoming traffic (i.e., vehicle 403) being above a predetermined speed threshold, the ego vehicle classifies the road 401 as not being a divided highway. Similarly, referring to FIG. 4B, if the ego-vehicle (EV) 406 is traversing an intersection 405 and detects (via a line of sight sensor) a lateral vehicle 407 having a speed of at least 6 mph, the ego-vehicle classifies road 405 as not being a divided highway. It must be appreciated that the road type can also be identified by one embodiment, using identification of road signs (via camera), including but not limited to speed limit signs, divided highway entrance signs, and the like.

The process 300 then proceeds to step S320, wherein the EFCW system performs an estimation of geometry of the lane of the road in which the host vehicle is traversing. According to one embodiment, the EFCW system also performs a remote vehicle lane classification. Specifically, the host vehicle determines whether a remote vehicle is travelling in the same lane as the host vehicle or whether the remote vehicle is traversing on a different lane (on the same road) as compared to the host vehicle's lane. Details pertaining to the ego-lane geometry estimation and the remote vehicle lane classification are described later with reference to FIG. 4C and FIG. 5.

The process further proceeds to step S330, wherein the host vehicle performs a remote vehicle down selection process. Specifically, for a high number of detected remote vehicles, the host vehicle performs a filtering process, which enables the host vehicle to determine which remote vehicles need to be tracked by the non-line of sight sensors. By performing the remote vehicle down selection process (S330) provides the host vehicle the advantageous ability of utilizing ECU processing capacity in an efficient manner.

The ECU of the host vehicle has a finite amount of processing resources. In vehicular communication systems, CPU resources need to be allocated for processing intensive operations such as parsing the abstract syntax notation (ASN) 1.0 data packets transmitted by other vehicles, performing certificate validation (i.e., authenticating certificates transmitted in data packets transmitted by remote vehicles), tracking remote vehicle path history, and the like. Accordingly, the host vehicle performs the remote vehicle selection process (described later in detail with reference to FIGS. 6A-6C) to utilize processing capacity in an efficient manner.

The process 300 further proceeds to step S340, wherein the host vehicle estimates vehicle density in the ego lane of the host vehicle. By one embodiment, the EFCW that is implemented in the host vehicle utilizes the density estimation to predict the motion of the preceding vehicle. Details regarding the density estimation are described later with reference to FIG. 7.

The process then moves to step S350, wherein by one embodiment, based on the computations performed in steps S310 to S340, the EFCW system predicts the motion of the preceding vehicle and thereby generates warnings to the driver of the host vehicle. Details regarding the preceding vehicle's motion estimation are described later with reference to FIG. 8. As stated previously, it must be appreciated that the EFCW system may perform all, or some the steps depicted in FIG. 3 to generate the warning messages to be transmitted to the driver of the host vehicle.

In what follows, a detailed description is provided for the steps S320 to S350 as outlined in the flowchart of FIG. 3.

Figure 4C:
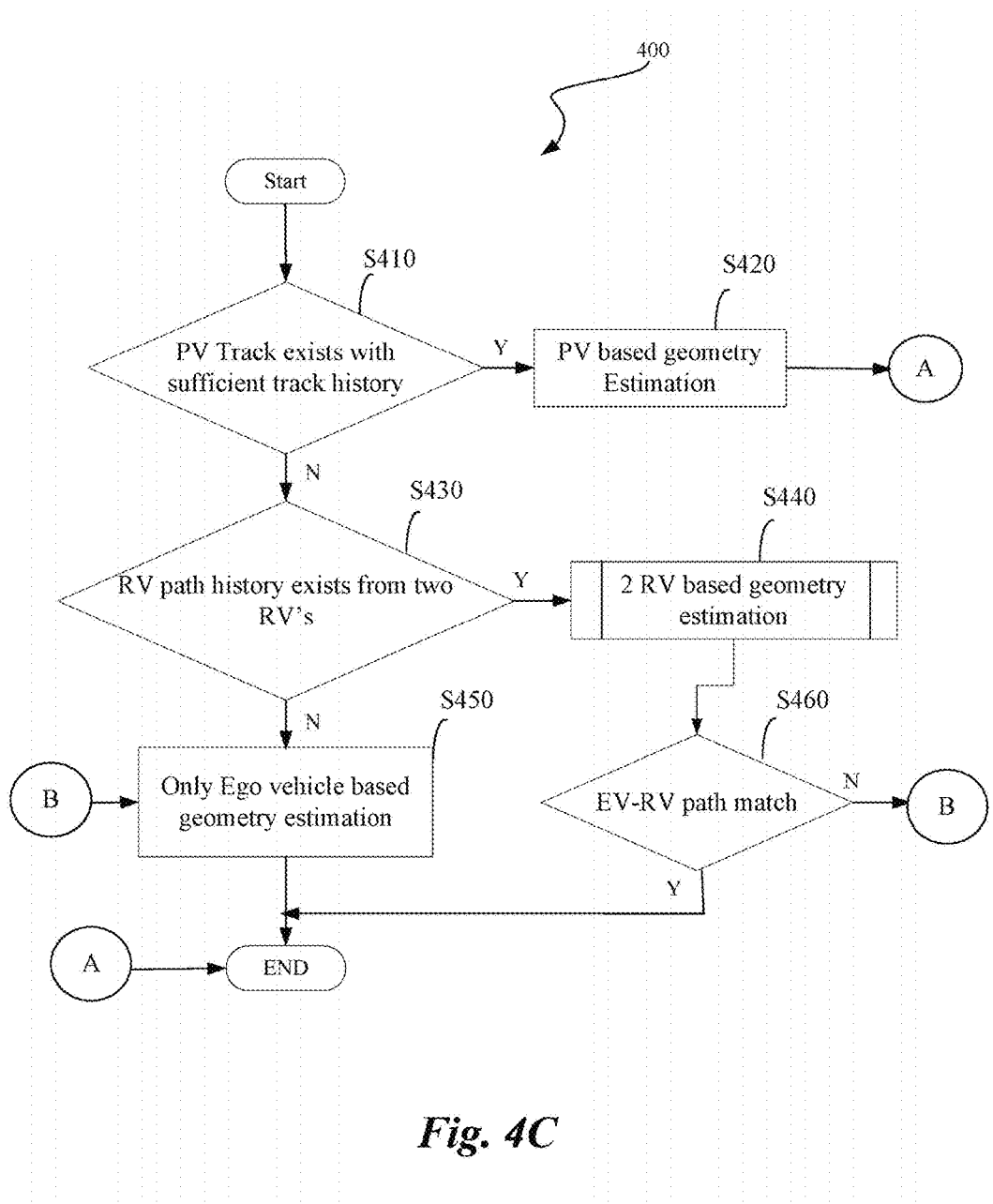
FIG. 4C depicts a flowchart illustrating the steps performed by a host vehicle to determine the geometry of the road lane in which the host vehicle is traversing.

Turning to FIG. 4C is depicted a flowchart illustrating the steps performed by a host vehicle to estimate the geometry of the road-lane in which the host vehicle is traversing. According to one embodiment, the host vehicle utilizes a priority mechanism in estimating the geometry of the lane. Specifically, the host vehicle determines, in decreasing order of priority, whether the preceding vehicle's track history is available, whether the remote vehicles track history (along with the host vehicle's predicted path) is available from two remote vehicles, or whether the host vehicle should estimate the geometry of the lane based only on the predicted path of the host vehicle.

As shown in FIG. 4C, the process of estimating the geometry of the lane commences in step S410, wherein a query is made to determine whether a sufficient track history of the preceding vehicle exists. Note that the host vehicle receives data corresponding to the track history of the preceding vehicle, for instance, information in the (ASN) 1.0 data packets that are transmitted by the preceding vehicle.

If the response to the query in step S410 is affirmative, the process proceeds to step S420. In step S420, the host vehicle estimates the geometry of the lane based on the track history information of the preceding vehicle. According to one embodiment, the host vehicle implements a batch processing technique such as least squares fitting and/or a Kalman filtering based technique to estimate the geometry of the lane. Under the assumption that vehicles do not deviate far from the lane center, the lane geometry estimation based on vehicle path can be performed as a problem of fitting a cubic polynomial to the path history points of the preceding vehicle. Other methods of estimating the geometry of the lane may include Kalman filter/sensor fusion using lane marker recognition as described in U.S. Pat. No. 6,292,752, as well as more complex road models such as the two-clothoid method described in U.S. Pat. No. 6,751,547 B2. Upon performing the estimation of the road geometry (based on the track history information of the preceding vehicle) in step S420, the process in 400 terminates.

However, if the response to the query in step S410 is negative, the process proceeds to step S430. In step S430, a query is made to determine whether the path history of two remote vehicles is available. If the response to the query in step S430 is affirmative, the process moves to step S440. However, if the response to the query is negative, the process moves to step S450.

In step S440, the host vehicle estimates the geometry of the lane based on the track history of two remote vehicles. Details regarding this estimation are described later with reference to FIG. 5. It must be appreciated that while the host vehicle performs the estimation of the road geometry based on the track history of two remote vehicles (S440), the host vehicle also includes the host vehicles predicted path in successfully estimating the road-lane geometry. Specifically, as shown in step S460, a query is made to determine, whether the path obtained based on the path history of the two remote vehicles matches a predicted path of the host vehicle.

If the response to the query in step S460 is affirmative, the process terminates. However, if the response to the query (S460) is negative, the process proceeds to step S450 to perform the estimation of the geometry of the lane based only on the host vehicle's predicted path.

In step S450, the host vehicle performs geometry estimation of the lane based only on the predicted path of the host vehicle. For instance, according to one embodiment, the host vehicle predicts its future path based on a current steering angle of the host vehicle and/or a rate of change of the steering angle. Accordingly, based on the predicted path of the host vehicle, the host vehicle estimates the geometry of the lane in which it is traversing. Upon completing the estimation of the road geometry in step S450, the process 400 as illustrated in FIG. 4C terminates.

Additionally, by one embodiment, in the above described techniques of estimating the geometry of the road lane, the host vehicle may utilize information available from the DAS map (205 of FIG. 2) as well as lane marker recognition information in the steps of S420, S440, and S450, respectively, to estimate the geometry of the lane.

Furthermore, by one embodiment, the host vehicle performs a process of classifying a lane in which a remote vehicle is traversing. Specifically, assuming that the host vehicle detects a highway type of road, the host vehicle classifies the remote vehicle as traversing in one of an 'in-lane' remote vehicle (i.e., traversing in the same lane as the host vehicle), and an 'in-road' remote vehicle (i.e., traversing on the same road, but not in the same lane as the host vehicle).

The host vehicle classifies the remote vehicle as a remote vehicle traversing in the same lane as the host vehicle (i.e., in-lane) based on the following two conditions being satisfied. The host vehicle first determines based on the path history of the remote vehicle, whether the remote vehicle is detected to be within a half-lane width across the center of the host vehicle's lane at the following three spatial-time instances: at the remote vehicle's current location, at a location that is half way between the remote vehicle's current location and the location of the preceding vehicle, and at a time instant when the remote vehicle was at the preceding vehicles current location. Furthermore, as a second condition, the host vehicle classifies the remote vehicle as an in-lane remote vehicle based on the remote vehicle's heading angle being within 45° from the host lane's heading along the path history of the remote vehicle.

The host vehicle classifies the remote vehicle as an in-road remote vehicle (i.e., a remote vehicle traversing on the same road, but not in the same lane, as the host vehicle) based on the following two conditions being satisfied. The host vehicle first determines based on the path history of the remote vehicle, whether the remote vehicle is detected to be within two-lane widths across the center of the host vehicle's lane at the following three spatial-time instances: at the remote vehicle's current location, at a location that is half way between the remote vehicle's current location and the location of the preceding vehicle, and at a time instant when the remote vehicle was at the preceding vehicles current location and at a time instant when the remote vehicle was at the host vehicle's current location. Furthermore, as a second condition, the host vehicle classifies the remote vehicle as an in-road remote vehicle based on the remote vehicle's heading angle being within 45° from the host lane's heading along the path history of the remote vehicle.

Figure 5:
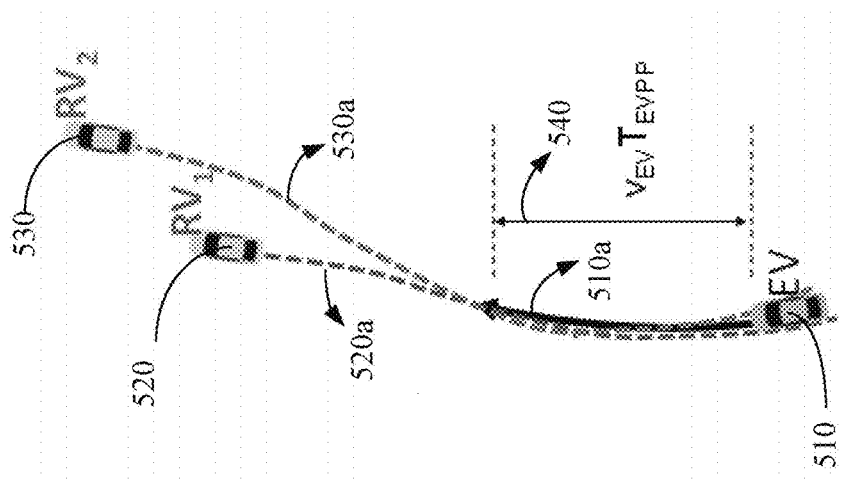
FIG. 5 illustrates a schematic depicting lane estimation based on path history of two remote vehicles.

Turning to FIG. 5 is illustrated a schematic diagram depicting the lane geometry estimation based on the path histories of two remote vehicles. Specifically, the lane geometry estimation of step S440 of FIG. 4C is described herein with reference to FIG. 5.

FIG. 5 depicts a host vehicle 510 (also referred to herein as an ego-vehicle and represented as EV) that detects two remote vehicles 520 and 530 that are represented as $RV_1$ and $RV_2$, respectively. According to one embodiment, the host vehicle 510 determines the two remote vehicles 520 and 530 to be the remote vehicles that are closest to a slowest moving remote vehicle. Note however, that if only two remote vehicles are detected, both the detected vehicles will be used to estimate the geometry of the lane in which the host vehicle is traversing.

The host vehicle 510 processes and generates the path histories 520a and 530a of the remote vehicles 520 and 530 respectively. Specifically, the remote vehicles 520 and 530 transmit data packets that are processed in the ECU of the host vehicle. Accordingly, the host vehicle 510 processes the data packets and further generates the path histories of the remote vehicles 520 and 530, respectively.

The host vehicle 510 also predicts its future path based on a current steering angle of the host vehicle. In doing so, the host vehicle generates its predicted path that is depicted as path 510a in FIG. 5. Upon generating the predicted path 510a, the host vehicle processes the path histories 520a and 530a of the remote vehicles 520 and 530, respectively, in order to ensure that at least one path history of the remote vehicles is not farther than a half-lane width from the host vehicle's predicted path, over a certain predetermined length 540.

Specifically, the host vehicle performs processing to ensure that at least one of the path histories of the remote vehicles is within half a lane width from the host vehicle's predicted path, over a distance $v_{ev}*T_{evpp}$, wherein the parameter $v_{ev}$ corresponds to the velocity of the host vehicle and the parameter $T_{evpp}$ is a predetermined time-duration, for example 2 seconds. Accordingly, the host vehicle estimates the geometry of the lane in which it is traversing based on a successful match of at least one of the path history of the remote vehicle to the host vehicle's predicted path.

Additionally, by one embodiment, when the path history of only one remote vehicle (out of the two remote vehicles 520 and 530) is within the half-lane width distance from the host vehicle's predicted path 510a, the host vehicle performs additional processing in estimating the geometry of the lane. For instance, if the path history 520a of the remote vehicle 520 is within the half-lane width distance from the host vehicle's predicted path 510a, the host vehicle 510 performs processing on the path history 530a of the remote vehicle 530, to ensure that the remote vehicle 530 remains at a constant lateral offset from the path of the other remote vehicle. In doing so, the host vehicle 510 determines whether there is a divergence in the paths of the two remote vehicles. For instance, as shown in FIG. 5, the path history for remote vehicle 530 diverges from the path history of remote vehicle 520, thereby indicating that at least one of the two remote vehicles is performing a lane change. Thus, the host vehicle 510 estimates the geometry of the lane in which it is traversing based on a successful matching of the path history of at least one remote vehicle to the host vehicle's predicated path. In the above described processing technique for estimating the geometry of the lane, the lane width can be either assumed to be 10 feet wide, or alternatively, may be estimated based on lane marker information and DAS map (205 in FIG. 2) information. Accordingly, by one embodiment, the geometry of the lane is estimated based on path history of the remote vehicle that is within half lane width of the predicted path of the ego-vehicle. For instance, a least squares fit to the path of the vehicle with the closest offset to the ego-vehicle can be performed to estimate the lane geometry.

Figure 6A:
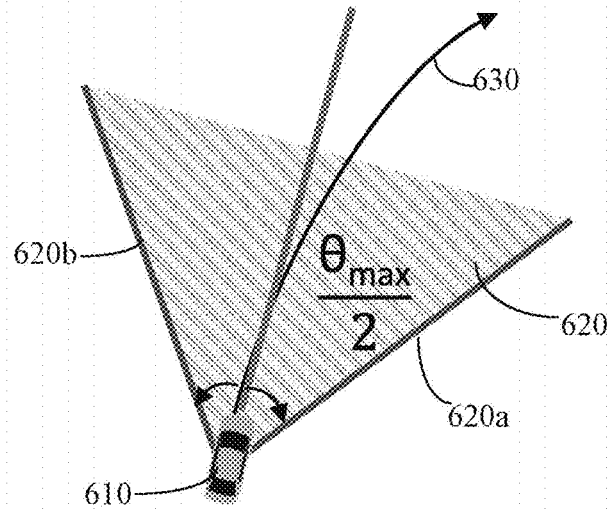
FIGS. 6A and 6B illustrate according to one embodiment, different scenarios for performing a remote vehicle down selection process.
Figure 6B:
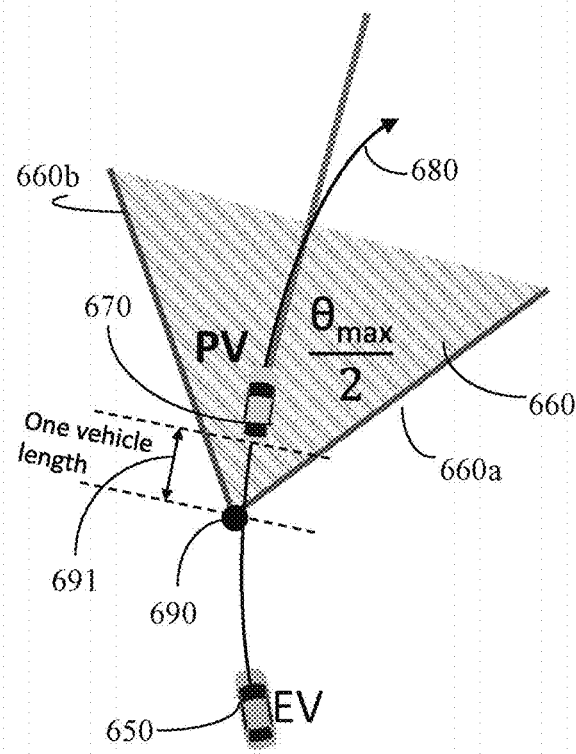

FIGS. 6A and 6B illustrate according to one embodiment, respective scenarios for performing the remote vehicle selection process (step S330 of FIG. 3). As stated previously, the ECU of the host vehicle has a finite amount of processing resources. In an effort to utilize the processing resources of the ECU efficiently, the host vehicle performs a remote vehicle selection process. Specifically, the host vehicle performs a filtering process to identify which remote vehicles need to be tracked.

Assuming a highway type of road, the host vehicle initially determines whether a preceding vehicle has been tracked sufficiently for a predetermined distance. Specifically, the host vehicle determines whether sufficient path history corresponding to the preceding vehicle is available. Based on sufficient path history of the preceding vehicle being available, the host vehicle performs a remote vehicle selection process based on the preceding vehicle's predicted path as depicted in FIG. 6B. However, if sufficient path history of the preceding vehicle is not available, the host vehicle performs the remote vehicle selection process based on a host vehicle's predicted path as depicted in FIG. 6A.

FIG. 6A illustrates a framework, wherein the remote vehicle selection process is performed based on the host vehicle's predicted path. As shown in FIG. 6A, in the absence of a preceding vehicle, the host vehicle 610 utilizes its own predicted path 630 to select remote vehicles. Further, the host vehicle 610 generates an angular prediction region (i.e., the shaded region 620) formed by boundaries 620a and 620b, respectively. The boundaries 620a and 620b respectively form an angle of $(\theta_{max}/2)$ with the predicted path 630 of the host vehicle 610. The techniques of selecting remote vehicles based on such a framework are described next with reference to FIG. 6C.

FIG. 6B illustrates a framework, wherein the remote vehicle selection process is performed based on a predicted path of a preceding vehicle. Specifically, as shown in FIG. 6B, the host vehicle 650 detects a preceding vehicle 670 and further predicts the preceding vehicle's path 680. Similar to FIG. 6A, the host vehicle 650 generates an angular prediction region (shaded region 660) formed by boundaries 660a and 660b, respectively. The boundaries 660a and 660b respectively form an angle of ($\theta_{max}/2$) with the predicted path 680 of the preceding vehicle 670. Note however, that the angular prediction region 660 is not generated with respect to the location of the preceding vehicle 670, but rather is generated based on a location 690, which is disposed one vehicle length 691 behind the location of the preceding vehicle 670. In doing so, provides the host vehicle the advantageous ability of provisioning the preceding vehicle to be considered as a remote vehicle. The techniques of selecting remote vehicles based on such a framework are described next with reference to FIG. 6C.

For the sake of simplicity, the filtering process performed by the host vehicle in selecting remote vehicles that need to be tracked, is described with reference to the non-limiting example of FIG. 6C, for the framework of FIG. 6B. It must be appreciated that a similar process can be performed on the framework as depicted in FIG. 6A.

Figure 6C:
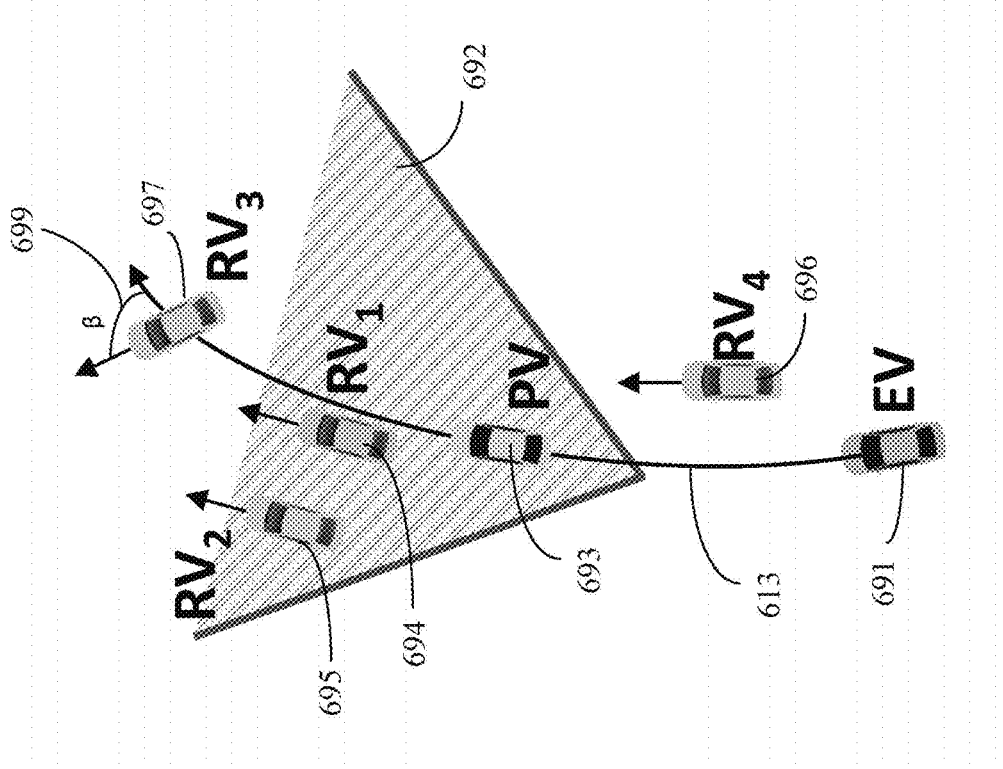
FIG. 6C depicts a non-limiting example illustrating a filtering process performed by the host vehicle.

As shown in FIG. 6C, the host vehicle 691 performs the filtering process to determine which remote vehicles need to be tracked based on the predicted path 613 of a preceding vehicle 693. For sake of simplicity, four remote vehicles 694, 695, 696, and 697 are identified by the host vehicle 691, wherein one of the remote vehicles, 696 lies outside the shaded region 692.

The host vehicle 691 performs the filtering process based on certain conditions being satisfied. For instance, according to one embodiment, the host vehicle 691 imposes a first condition that the potential remote vehicles that may be tracked be located within ($\theta_{max}/2$) of the predicted path 613 of the preceding vehicle 693. In other words, the host vehicle ensures that the remote vehicles that are tracked lie in the generated angular prediction region 692. Remote vehicles that violate this condition are not selected for tracking purposes. For instance, as shown in FIG. 6C, the remote vehicle 696 is located outside the shaded region 692 and is thereby not selected.

Furthermore, the host vehicle 691 may impose a differential speed threshold and a distance threshold condition to filter the remote vehicles. Specifically, the host vehicle 691 may impose a differential speed condition wherein, the speed at which a particular remote vehicle is traversing be lower than the speed of the host vehicle by a predetermined amount (i.e., $V_{RV}-V_{HV} \leq V_{Diff}$, where $V_{RV}$ is the speed of the remote vehicle, $V_{HV}$ is the speed of the host vehicle and $V_{Diff}$ is the predetermined differential speed threshold).

In a similar manner, the host vehicle 691 may impose a distance threshold condition, wherein the distance between the remote vehicle and the host vehicle must not exceed a predetermined distance threshold. Any remote vehicle that violates either of the distance threshold condition and/or the differential speed threshold condition is not selected as a remote vehicle that will be tracked by the host vehicle 691.

According to one embodiment, the host vehicle 691 may impose a heading angle threshold to filter the remote vehicles. Specifically, the host vehicle 691 may impose a condition that a particular remote vehicle's heading angle (defined herein as the angle formed between the direction in which the remote vehicle is headed and the predicted path of the preceding vehicle) be within a predetermined heading angle threshold. As shown in FIG. 6C, the remote vehicle 697 has a heading angle 699 (represented as $\beta$) with respect to the predicted path 613 of the preceding vehicle 693. Based on the heading angle $\beta$ being greater than the predetermined heading angle threshold $\theta_{heading}$ (i.e., $\beta \geq \theta_{heading}$), the host vehicle does not select the remote vehicle to be tracked.

According to one embodiment, the ECU of the host vehicle includes a memory of a limited size (e.g., memory 209 of FIG. 2). Accordingly, the host vehicle maintains a queue that includes at most 'N' tracked remote vehicles. Note that the messages (e.g., heartbeat messages such as basic safety message (BSM) transmitted by these N remote vehicles) are fully parsed and validated by the ECU of the host vehicle. Due to limited memory size, according to one embodiment, the host vehicle may implement a priority mechanism that determines which remote vehicles are to be tracked. For instance, the host vehicle may assign a higher priority to a remote vehicle that is laterally closer to the predicted path of the preceding vehicle. In such an instance, referring to FIG. 6C, the remote vehicle 694 ($RV_1$) is assigned a higher priority than the remote vehicle 695 ($RV_2$). Accordingly, by assigning priority to the remote vehicles in the manner described above, offers the host vehicle the advantageous ability of selecting remote vehicles closest to the predicted path, thereby tending to select remote vehicles that lie along the path.

It must be appreciated that the host vehicle is by no means restricted to impose all of the above described conditions in performing the filtering process to determine which remote vehicles need to be tracked. Rather, the host vehicle may select some or all of the above described conditions in performing the filtering process. In a similar manner, the host vehicle may choose any other priority allocation scheme in assigning the priorities to the remote vehicles. For instance, a remote vehicle may set an event flag in the BSM data packet that is transmitted to the host vehicle. Such a flag may be set for instance, when the remote vehicle is braking hard. The event flag thus serves as an urgent warning mechanism by which the remote vehicles may communicate with the host vehicle. Accordingly, the host vehicle while allocating priority to the remote vehicles may choose to assign a highest priority to a remote vehicle that has set the event flag in the BSM.

Figure 7:
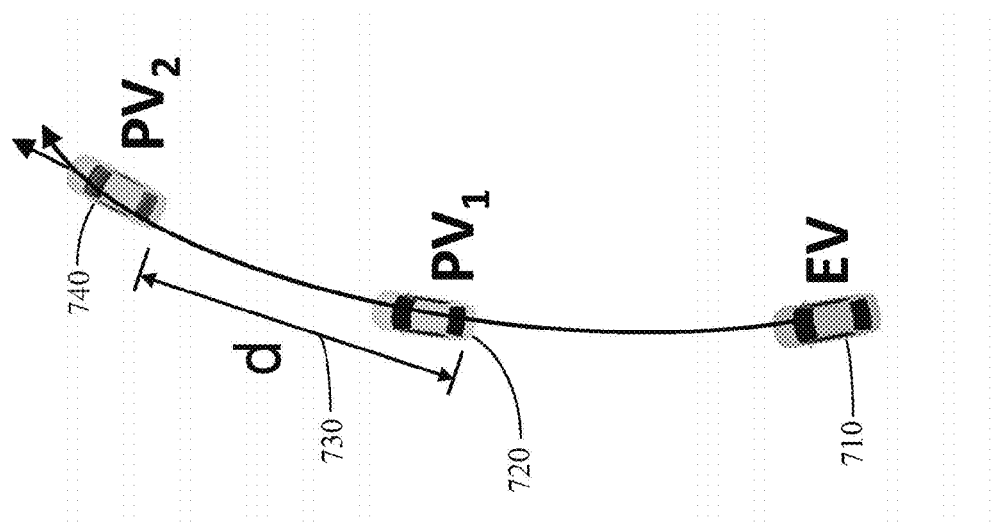
FIG. 7 illustrates according to one embodiment, a schematic representing vehicle density estimation performed by the host vehicle.

Turning to FIG. 7 is illustrated according to one embodiment of the present disclosure, a schematic representing vehicle density estimation performed by the host vehicle. The host vehicle performs a vehicle density estimation to predict the motion of the preceding vehicle. Specifically, the host vehicle determines how many vehicles are disposed between the host vehicle and a remote vehicle that may potentially come to a halt. Based on such a determination, the host vehicle predicts the motion of the preceding vehicle (described later with reference to FIG. 8) and provides a warning message to the driver of the host vehicle.

By one embodiment, the host vehicle utilizes line of sight sensors to detect two preceding vehicles. As shown in FIG. 7, the host vehicle 710 detects via line of sight sensors the preceding vehicle 720 ($PV_1$) and the preceding vehicle 740 ($PV_2$). In order to estimate the vehicle density, the host vehicle initially verifies whether the farthest preceding vehicle ($PV_2$) is traversing in the same lane as the host vehicle.

Upon a successfully verification, by one embodiment, the host vehicle 710 estimates a lane density, $d_{lane}$, (i.e., density of vehicles traversing in the same lane as the host vehicle) as an average of: the inverse distance between the two preceding vehicles detected via the line of sight sensors (i.e., the straight line distanced represented as 730 in FIG. 7) and an empirical density computed based on a current speed of the host vehicle. For instance, the empirical density may be computed based on an empirical model that may take into account historical data for the specific road, at the specific day-of-week and time-of-day and speed. Furthermore, the host vehicle may filter the above computed lane density by using a low pass filter, e.g., a low pass filter having a cutoff frequency of 0.2 Hz.

Figure 8:
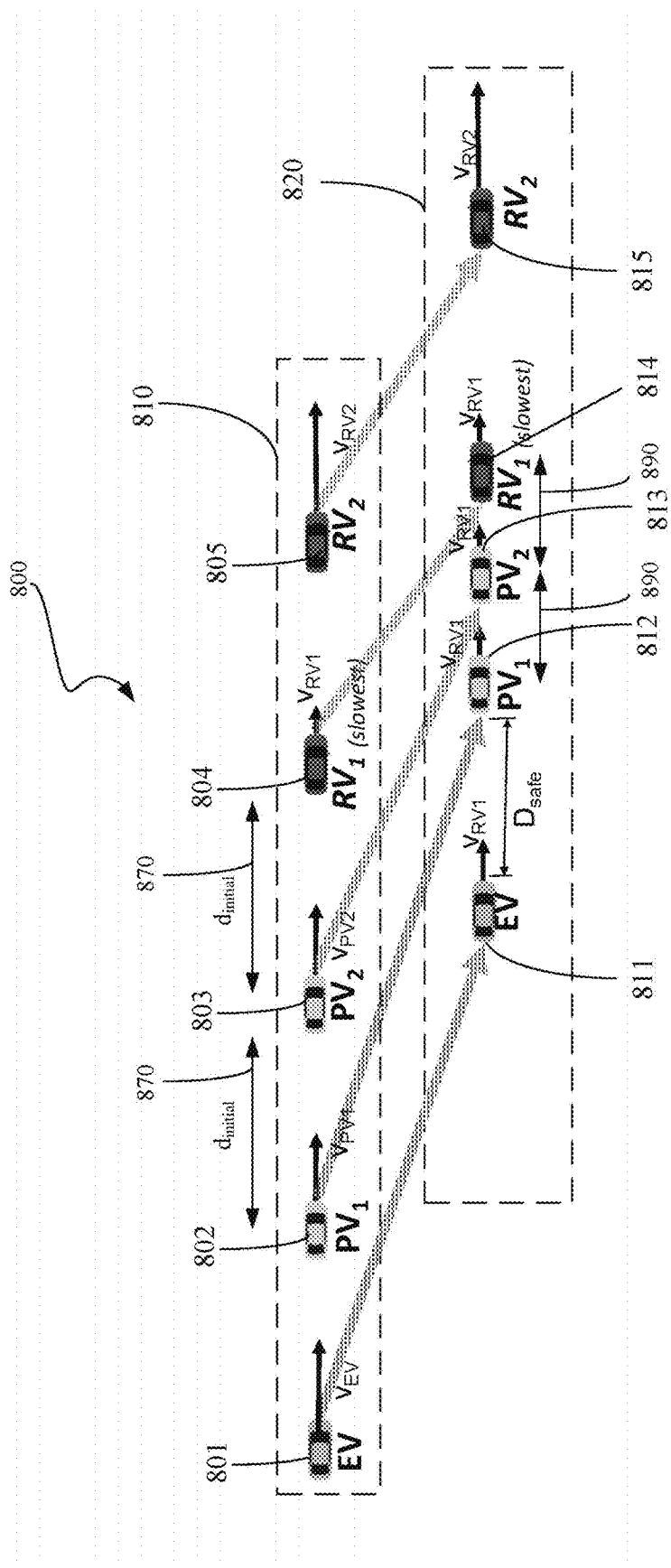
FIG. 8 illustrates a schematic depicting motion prediction of a preceding vehicle.

FIG. 8 illustrates a schematic 800 depicting motion prediction of a preceding vehicle. The schematic 800 depicts an initial configuration 810 of a platoon of vehicles, and a steady state configuration 820 of the platoon of vehicles. The initial configuration 810 includes a host vehicle 801 (EV) traversing at a speed $V_{EV}$, two preceding vehicles 802 and 803 that are traversing at speeds $V_{PV1}$ and $V_{PV2}$, respectively, and two remote vehicles 804 and 805 that are traversing at speeds $V_{RV1}$ and $V_{RV2}$, respectively. Further for the sake of simplicity, the average inter-vehicular distance 870 between vehicles 803-804 and 802-803 is represented $d_{initial}$.

By one embodiment, the host vehicle 801 determines (via non-line of sight sensors) the slowest remote vehicle traversing in its lane. For instance, as shown in FIG. 8, in the initial configuration 810, the host vehicle 801 determines that the remote vehicle 804 is travelling at a slower speed as compared to the detected speed (via non-line of sight sensors) of the remote vehicle 805, i.e., $V_{RV1} \leq V_{RV2}$. Note that as described previously with reference to FIG. 6C, the speed difference between the speed of the remote vehicle 804 and the speed of host vehicle 801 is lower than the differential speed threshold.

According to one embodiment, based on the initial configuration 810, the host vehicle predicts that the preceding vehicle will immediately start decelerating (at a uniform rate of deceleration), such that the inter-vehicular distance, when the speed of the preceding vehicle is equal to the speed of the slowest remote vehicle, is a fixed predetermined distance (e.g., inter-vehicular distance of 10 meters). For instance, as shown in the final configuration 820 in FIG. 8, the preceding vehicles 812 and 813 respectively have decelerated (from their initial speeds of $V_{PV1}$ and $V_{PV2}$, respectively) to the speed of the remote vehicle 814 (i.e., $V_{RV1}$), such that the inter-vehicular distance represented as 890 is 10 meters. Note that since the initial speed of the remote vehicle 805 (and subsequently 815) is greater than the speed of the remote vehicle 804, the remote vehicle 805 is not considered in predicting the motion of the preceding vehicle.

According to one embodiment, the host vehicle may predict the speed of the preceding vehicle based on an empirical model (described in U.S. Pat. No. 8,948,995, and incorporated herein by reference in its entirety) and an estimate of a number of vehicles between the host vehicle and the slowest remote vehicle. For instance, the number of vehicles between the host vehicle and the slowest remote vehicle may be estimated based on a detected distance between the host vehicle and the slowest remote vehicle, and the inter-vehicular distance. Alternatively, the technique of estimating vehicle density as described previously with reference to FIG. 7 may also be used to estimate the vehicle density.

By one embodiment of the present disclosure, upon predicting the motion of the preceding vehicle, the ECU of the host vehicle issues a warning to the driver of the host vehicle, based on a determination made by the ECU, that the driver of the host vehicle cannot perform all of the following functions: brake comfortably with a rate of deceleration being lower than a predetermine comfortable deceleration rate, brake within a predetermined reaction time, and avoid a collision (or in other words, maintain a predetermined safe distance) with the preceding vehicle by a predetermined safe distance i.e., the distance represented as $D_{safe}$ in the steady state configuration 820 of FIG. 8.

Additionally, the ECU by one embodiment, may also issue the warning messages based on either a remote vehicle coming to a halt (i.e., remote vehicle is stopped), or the in-lane remote vehicle's rate of deceleration and/or the in-lane preceding vehicle's rate of deceleration being greater than a predetermined deceleration rate (e.g., deceleration rate corresponding to a scenario of a vehicle braking hard such as an the emergency electronic brake light situation).

Each of the functions of the described embodiments may be implemented by one or more processing circuits. A processing circuit includes a programmed processor (for example, processor 903 in FIG. 9), as a processor includes circuitry. A processing circuit also includes devices such as an application-specific integrated circuit (ASIC) and circuit components that are arranged to perform the recited functions.

Figure 9:
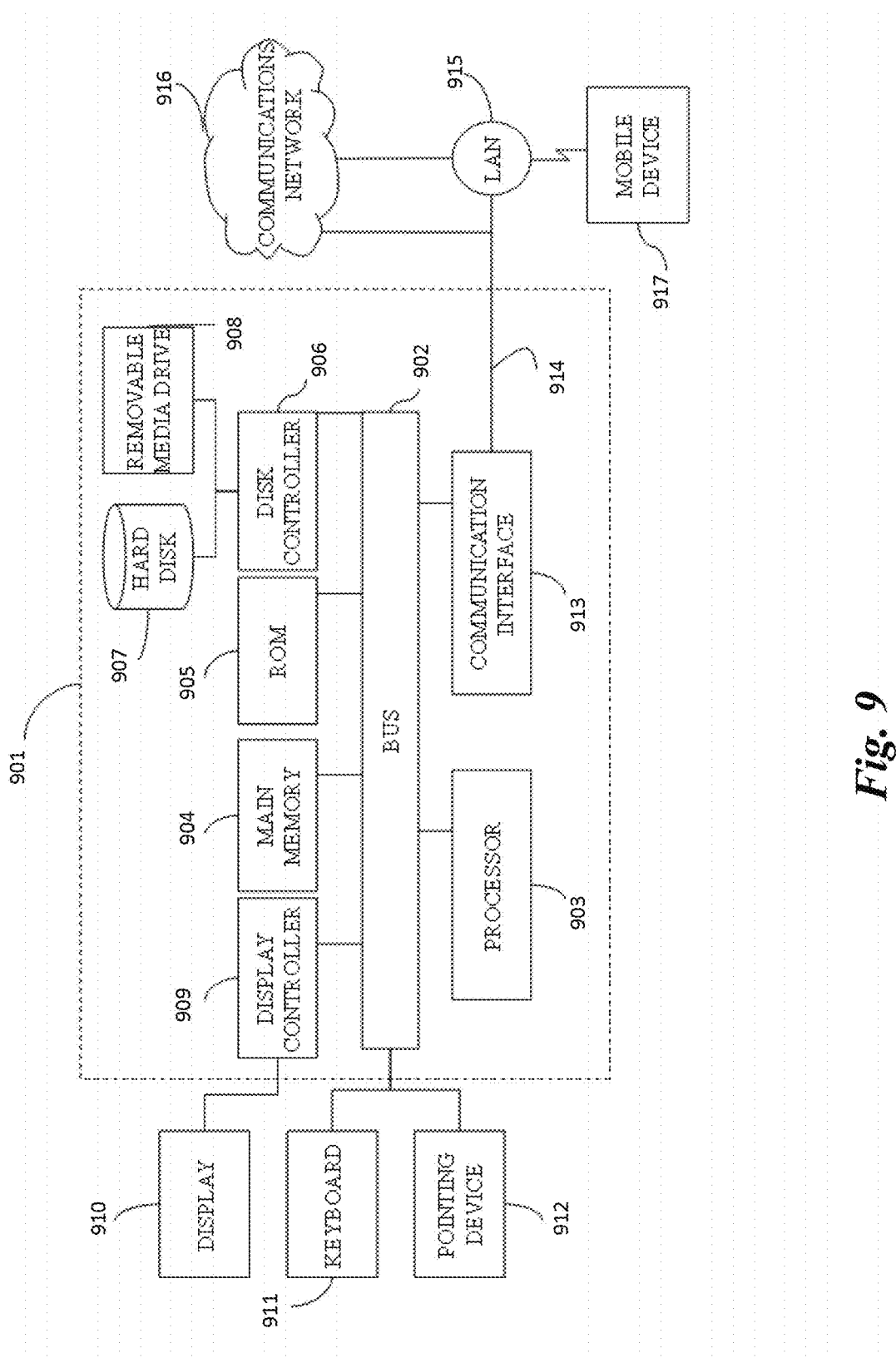
FIG. 9 illustrates a block diagram of a computing device according to one embodiment.

The various features discussed above may be implemented by a computer system (or programmable logic). FIG. 9 illustrates such a computer system 901. In one embodiment, the computer system 901 is a particular, special-purpose machine when the processor 903 is programmed to perform placement of the bolt, aligning and positioning of a probe within the bolt and the like.

The computer system 901 includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 901 may also include a display controller 909 coupled to the bus 902 to control a display 910, for displaying information to a computer user. The computer system includes input devices, such as a keyboard 911 and a pointing device 912, for interacting with a computer user and providing information to the processor 903. The pointing device 912, for example, may be a mouse, a trackball, a finger for a touch screen sensor, or a pointing stick for communicating direction information and command selections to the processor 903 and for controlling cursor movement on the display 910.

The processor 903 executes one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 901, for driving a device or devices for implementing the features of the present disclosure, and for enabling the computer system 901 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 903 for execution. A computer readable medium may take many forms, including but not limited to, non-volatile media or volatile media. Non-volatile media includes, for example, optical, magnetic disks, and magneto-optical disks, such as the hard disk 907 or the removable media drive 908. Volatile media includes dynamic memory, such as the main memory 904. Transmission media, on the contrary, includes coaxial cables, copper wire and fiber optics, including the wires that make up the bus 902. Transmission media also may also take the form of acoustic or light waves, such as those generated during radio wave and infrared data communications.

Various forms of computer readable media may be involved in carrying out one or more sequences of one or more instructions to processor 903 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 901 may receive the data on the telephone line and place the data on the bus 902. The bus 902 carries the data to the main memory 904, from which the processor 903 retrieves and executes the instructions. The instructions received by the main memory 904 may optionally be stored on storage device 907 or 908 either before or after execution by processor 903.

The computer system 901 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a network interface card to attach to any packet switched LAN. As another example, the communication interface 913 may be an integrated services digital network (ISDN) card. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local network 915 (e.g., a LAN) or through equipment operated by a service provider, which provides communication services through a communications network 916. The local network 914 and the communications network 916 use, for example, electrical, electromagnetic, or optical signals that carry digital data streams, and the associated physical layer (e.g., CAT 5 cable, coaxial cable, optical fiber, etc.).

The computer system 901 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

The invention claimed is:

1. A method of generating a collision warning to a driver of a host vehicle, the method comprising:
    estimating, by circuitry, a geometry of a lane of a road in which the host vehicle is traversing;
    identifying, via a non-line-of-sight sensor, at least one remote vehicle traversing ahead of the host vehicle in the estimated lane of the road;
    tracking, via a line of sight sensor, a preceding vehicle traversing directly ahead of the host vehicle in the estimated road-lane;
    detecting a speed of a slowest remote vehicle of the at least one identified remote vehicles;
    predicting by circuitry, a motion of the preceding vehicle based on the detected speed of the slowest remote vehicle and an inter-vehicle distance; and
    generating a warning to the driver of the host vehicle based on the predicted relative motion of the preceding vehicle to the host vehicle,
    wherein identifying the at least one remote vehicle traversing in the estimated lane of the road is based on a path history of the at least one remote vehicle being detected to be within a half-lane displacement across a center of the estimated lane at three predetermined locations, and a heading angle of the at least one remote vehicle being lower than a predetermined angle relative to the estimated lane.

2. The method of claim 1, wherein the estimating step further comprising:
    determining by the circuitry, based on a decreasing order of priority, whether one of the preceding vehicle's track history is available, track histories of two remote vehicles closest to the detected slowest remote vehicle are available, and a predicted path of the host vehicle is available.

3. The method of claim 1, wherein the three predetermined locations include a first location corresponding to a current location of the remote vehicle, a second location corresponding to a location that is midway between the remote vehicle's current location and the preceding vehicle's current location, and a third location corresponding to the preceding vehicle's current location.

4. The method of claim 2, wherein based on the track histories of two remote vehicles closest to the detected slowest remote vehicle being available, the method further comprising:
    determining by circuitry, whether a first remote vehicle of the two remote vehicles is displaced further than half-a-lane width from the host vehicle's predicted path over a predetermined length along the host vehicles predicted path.

5. The method of claim 4, further comprising:
    determining by circuitry, whether a displacement of a track history of a second remote vehicle of the two remote vehicles with respect to a track history of the first remote vehicle of the two remote vehicles is constant.

6. The method of claim 1, further comprising:
    filtering, based on an identified number of remote vehicles being greater than a predetermined number of remote vehicles, the identified number of remote vehicles in order to determine which remote vehicles are to be tracked by the host vehicle, the filtering being performed based on one of a predicted path of the host vehicle and a predicted path of the preceding vehicle.

7. The method of claim 6, wherein the filtering further comprising:
    determining, for each remote vehicle of the identified number of remote vehicles, whether the identified remote vehicle is located within an angular prediction region, a speed of the remote vehicle is less than a speed of the host vehicle, a distance between the identified remote vehicle and the host vehicle is within a predetermined distance, and a heading angle of the remote vehicle is lower than a predetermined heading threshold angle.

8. The method of claim 1, further comprising:
    determining, the identified remote vehicle to be an in-road remote vehicle based on a path history of the remote vehicle being within two-lane widths across the center of the estimated lane.

9. The method of claim 1, wherein the predicting further comprising:
    estimating by circuitry, a vehicle density between the host vehicle and the slowest remote vehicle, the inter-vehicle distance being computed based on the estimated vehicle density and a distance between the host vehicle and the slowest remote vehicle.

10. The method of claim 1, wherein the motion of the preceding vehicle is predicted to decelerate at a uniform rate of deceleration such that the inter-vehicle distance between the preceding vehicle and the slowest remote vehicle, when the speed of the preceding vehicle is equal to the speed of the slowest remote vehicle, is a fixed distance.

11. The method of claim 1, wherein the warning to the driver of the host vehicle is generated based on a rate of deceleration of the host vehicle being equal to a predetermined rate of deceleration, a reaction time of the driver in applying brakes of the host vehicle being equal to a predetermined reaction time, and a distance between the host vehicle and the preceding vehicle, when the speed of the preceding vehicle after said deceleration at the said reaction time is equal to the speed of the slowest remote vehicle, is greater than a predetermined safe distance.

12. The method of claim 1, further comprising:
    classifying by circuitry, the road on which the host vehicle is traversing as one of a divided highway and a non-highway based on one of identifying via a camera, a speed limit of posted on a sign on the road, and estimating a speed of the host vehicle in a predetermined time-period, the road being classified as the divided highway based on the estimated speed of the host vehicle in the predetermined time-period being greater than a first speed threshold, and the road being classified as the non-highway based on the host vehicle detecting at least one of another vehicle having a relative longitudinal speed that is greater than a second speed threshold and another vehicle having a lateral speed that is greater than a third speed threshold.

13. A device for generating a collision warning to a driver of a host vehicle, the device comprising:
    circuitry configured to
        estimate a geometry of a lane of a road in which the host vehicle is traversing,
        identify, via a non-line-of-sight sensor, at least one remote vehicle traversing ahead of the host vehicle in the estimated lane of the road,
        track, via a line of sight sensor, a preceding vehicle traversing directly ahead of the host vehicle in the estimated road-lane,
        detect a speed of a slowest remote vehicle of the at least one identified remote vehicles,
        predict a motion of the preceding vehicle based on the detected speed of the slowest remote vehicle and an inter-vehicle distance, and
        generate a warning to the driver of the host vehicle based on the predicted relative motion of the preceding vehicle to the host vehicle,
    wherein the circuitry is further configured to determine based on a decreasing order of priority, whether one of the preceding vehicle's track history is available, track histories of two remote vehicles closest to the detected slowest remote vehicle are available, and a predicted path of the host vehicle is available.

14. The device of claim 13, wherein based on the track histories of two remote vehicles closest to the detected slowest remote vehicle being available, the circuitry is further configured to determine whether a first remote vehicle of the two remote vehicles is displaced further than half-a-lane width from the host vehicle's predicted path over a predetermined length along the host vehicles predicted path.

15. The device of claim 13, wherein the circuitry is further configured to filter, based on an identified number of remote vehicles being greater than a predetermined number of remote vehicles, the identified number of remote vehicles in order to determine which remote vehicles are to be tracked by the host vehicle, the filtering being performed based on one of a predicted path of the host vehicle and a predicted path of the preceding vehicle.

16. The device of claim 13, wherein the circuitry is further configured to estimate a vehicle density between the host vehicle and the slowest remote vehicle, the inter-vehicle distance being computed based on the estimated vehicle density and a distance between the host vehicle and the slowest remote vehicle.

17. The device of claim 13, wherein the warning to the driver of the host vehicle is generated based on a rate of deceleration of the host vehicle being greater than a predetermined rate of deceleration, a reaction time of the driver in applying brakes of the host vehicle being greater than a predetermined reaction time, and a distance between the host vehicle and the preceding vehicle, when the speed of the preceding vehicle is equal to the speed of the slowest remote vehicle, is greater than a predetermined safe distance.

18. A non-transitory computer readable medium having stored thereon a program that when executed by a computer, causes the computer to execute a method of generating a collision warning to a driver of a host vehicle, the method comprising:

estimating a geometry of a lane of a road in which the host vehicle is traversing;

identifying, via a non-line-of-sight sensor, at least one remote vehicle traversing ahead of the host vehicle in the estimated lane of the road;

tracking, via a line of sight sensor, a preceding vehicle traversing directly ahead of the host vehicle in the estimated road-lane;

detecting a speed of a slowest remote vehicle of the at least one identified remote vehicles;

predicting a motion of the preceding vehicle based on the detected speed of the slowest remote vehicle and an inter-vehicle distance; and generating a warning to the driver of the host vehicle based on the predicted relative motion of the preceding vehicle to the host vehicle, wherein identifying the at least one remote vehicle traversing in the estimated lane of the road is based on a path history of the at least one remote vehicle being detected to be within a half-lane displacement across a center of the estimated lane at three predetermined locations, and a heading angle of the at least one remote vehicle being lower than a predetermined angle relative to the estimated lane.

\* \* \* \* \*